(12) United States Patent
Parkinson et al.

(10) Patent No.: US 8,090,759 B2
(45) Date of Patent: Jan. 3, 2012

(54) SYSTEM FOR PRESERVING MESSAGE ORDER

(75) Inventors: Ian Westbrook Parkinson, Eastleigh (GB); Vicente Rosselli Suarez, Bracknell (GB); Graham Derek Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 11/561,979

(22) Filed: Nov. 21, 2006

(65) Prior Publication Data
US 2007/0124398 A1 May 31, 2007

(30) Foreign Application Priority Data
Nov. 25, 2005 (GB) .................................. 0524021.3

(51) Int. Cl.
*G06F 15/16* (2006.01)
(52) U.S. Cl. .................... 709/200; 709/227; 370/394
(58) Field of Classification Search .......... 709/200–203, 709/217–227, 228; 370/394
See application file for complete search history.

(56) References Cited

U.S. PATENT DOCUMENTS

| 6,604,205 | B1 * | 8/2003 | Huang ........................... 713/400 |
| 6,850,982 | B1 * | 2/2005 | Siegel ............................ 709/227 |
| 2002/0172192 | A1 * | 11/2002 | Hunzinger et al. ........... 370/352 |
| 2007/0047539 | A1 * | 3/2007 | Agarwal et al. .............. 370/384 |

* cited by examiner

*Primary Examiner* — Moustafa M Meky
(74) *Attorney, Agent, or Firm* — Thomas E. Lees, LLC

(57) ABSTRACT

Order associated with messages is preserved in an environment wherein a message includes an associated order identifier; a receiver is operable to receive a first message associated with a first order identifier and a selection component is operable to select a first entity for processing the first message. The system includes a determination component for determining whether a notification associated with completion of processing of the first message has been received by the receiver; and a controller for controlling the selection component to select a second entity for processing the second message, in response to a combination of receipt of the notification and a second message associated with the first identifier being received by the receiver preceding the receipt of the notification.

20 Claims, 11 Drawing Sheets

Table 1:

Producer log

| Sequence Identifier | Most recent sequence number | Consumer data |
|---|---|---|
| s1 | m1 | C1 |

Table 2:

Producer log

| Sequence Identifier | Most recent sequence number | Consumer data |
|---|---|---|
| s1 | m2 | C1 |

Table 3

Producer log

| Sequence Identifier | Most recent sequence number | Consumer data |
|---|---|---|
| s1 | m3 | C2 |

FIG. 7

Table 4:

Producer log

| Sequence Identifier | Most recent sequence number | Intermediary data |
|---|---|---|
| s1 | m1 | I1 |

Table 6:

Producer log

| Sequence Identifier | Most recent sequence number | Intermediary data |
|---|---|---|
| s1 | m2 | I1 |

FIG. 8

Table 5:

Intermediary log

| Sequence Identifier Inbound | Sequence Identifier Outbound | Most recent inbound sequence number | Producer data | Most recent outbound sequence number | Consumer data |
|---|---|---|---|---|---|
| s1 | s10 | m1 | P1 | m2 | C1 |

Table 7:

Intermediary log

| Sequence Identifier Inbound | Sequence Identifier Outbound | Most recent inbound sequence number | Producer data | Most recent outbound sequence number | Consumer data |
|---|---|---|---|---|---|
| s1 | s10 | m2 | P1 | m4 | C1 |

FIG. 9

SYSTEM FOR PRESERVING MESSAGE ORDER

FIELD OF THE INVENTION

The present invention relates to preserving message order in an asynchronous messaging system.

BACKGROUND OF THE INVENTION

With reference to FIG. 1, in an asynchronous messaging system (100), a sending application (termed "producer" (105) herein) sends a message to a queue (115) of a receiving application (termed "consumer" (110) herein) for processing.

When using an asynchronous messaging system, there is often a need for messages from a producer to be processed in the order in which they were sent. For example, if a set of messages represent inserts, updates, deletes etc. for a database, the results can be disastrous if the messages are processed out of order. For example, if an operation to insert a row, followed by an operation to delete a row is processed in the wrong order (i.e. the delete operation is processed before the insert operation), the result leaves a row that should have been deleted as remaining inserted.

A producer naturally orders messages as they are produced. To assure the order is maintained, the most common solution is to configure a producer to send all its messages to a single queue associated with a single consumer. The single consumer processes all messages from the queue in the order in which the messages were placed in to the queue.

Unfortunately, the consumer of such messages becomes a single point of failure. Furthermore, since only a single consumer is used, the system is not scalable. This solution restricts the ability to build dynamic, flexible, messaging architectures which can support different numbers of consumers. Advantageously, multiple consumers can aid with load balancing requirements, can be utilized to route around a failed consumer etc.

Thus, to provide scalability in some asynchronous messaging systems, multiple consumers are employed to process messages stored in a shared queue. There is no guarantee that different consumers will process messages taken from a shared queue at the same rate. With reference to an asynchronous messaging system (200) in FIG. 2, if two consumers (210, 220) listen on a single queue (215), one consumer may process messages faster than the other consumer.

For example, if Consumer 1 (210) executes operations at half the speed of Consumer 2 (220), Consumer 1 (210) can take twice as long as Consumer 2 (220) to process some messages. Furthermore, typically, Consumer 1 has no knowledge of the existence of Consumer 2. Thus a message sequence m1, m2, m3 may actually be processed in the order m1, m3, m2 if Consumer 2 (220) retrieves and processes message m1; Consumer 1 (210) retrieves m2; Consumer 2 (220) retrieves and processes message m3 before Consumer 1 (210) completes its processing of m2.

In one prior art solution, a system is disclosed that can be used when multiple consumers process messages from a shared queue. In the prior art, messages of a particular kind are marked (e.g. by a producer, a filtering application etc.) with a globally unique sequence number (GUS). The multiple consumers must have access to a first relational database that stores data (e.g. GUS, message payload) associated with a last message that was processed and a second relational database that stores data (e.g. GUS) associated with an out of sequence message. Thus if produced messages m1, m2 and m3 are received in the order m1, m3, m2, then m1 is processed first and is inserted in the first relational database. When m3 is received, a query against the first relational database determines that m3 is out of order. Message m3 is inserted in the second relational database until m2 is received. When m2 is received, a query is executed against the first relational database to determine that m1 has been processed. Thus, m2 and m3 can then be processed. The first relational database is then updated to reflect that m2 and m3 have been processed.

The prior art solution allows messages to become out of order in transit and then allows for the order to be re-established by utilizing GUS and relational databases. However, there is a requirement for message payload to be stored, which creates resource-consuming overhead. There is also a requirement for consumers to share access to the relational databases—this can cause overhead and reduce scalability, since the number of consumers that can share access to the relational databases is limited.

In some asynchronous messaging systems, multiple consumers are "clustered", wherein each consumer has an associated queue. To preserve message ordering, some systems typically provide a feature wherein a producer can select a single instance of a consumer to which to send messages. However, if the message is to be sent via a chain of different, clustered, consumers, either the message ordering requirement must be sacrificed (i.e. allow later messages to overtake earlier messages so that each consumer in the chain can be selected dynamically for each message) or the ability to build dynamic, flexible, messaging architectures is sacrificed (i.e. wherein each component explicitly specifies the next component to which the message must be sent).

SUMMARY OF THE INVENTION

The invention may be embodied as a system for preserving order associated with produced messages. In one embodiment, the invention is implemented in an environment wherein a message includes an associated order identifier. A receiver is operable to receive a first message associated with a first order identifier and a selection component is operable to select a first entity for processing the first message. The system includes a determination component for determining whether a notification associated with completion of processing of the first message has been received by the receiver; and a controller for controlling the selection component to select a second entity for processing the second message, in response to a combination of receipt of the notification and a second message associated with the first identifier being received by the receiver proceeding the receipt of the notification.

Advantageously, message order is preserved and messages do not fall out of order upon transmission of the messages. Advantageously, different consumers can be selected to process messages associated with an order (if an acknowledgement associated with all outstanding messages that have been sent to a single consumer has been received). This allows a flexible architecture to be established to deal with problems such as a need to route around failed consumers and the like.

BRIEF DESCRIPTION OF THE DRAWINGS

The present invention will now be described, by way of example only, with reference to preferred embodiments thereof, as illustrated in the following drawings:

FIG. 7 shows representations of a producer's log;

FIG. 8 shows representations of a producer's log; and

FIG. 9 shows representations of an intermediary's log.

DETAILED DESCRIPTION OF PREFERRED EMBODIMENTS

Figure 1:
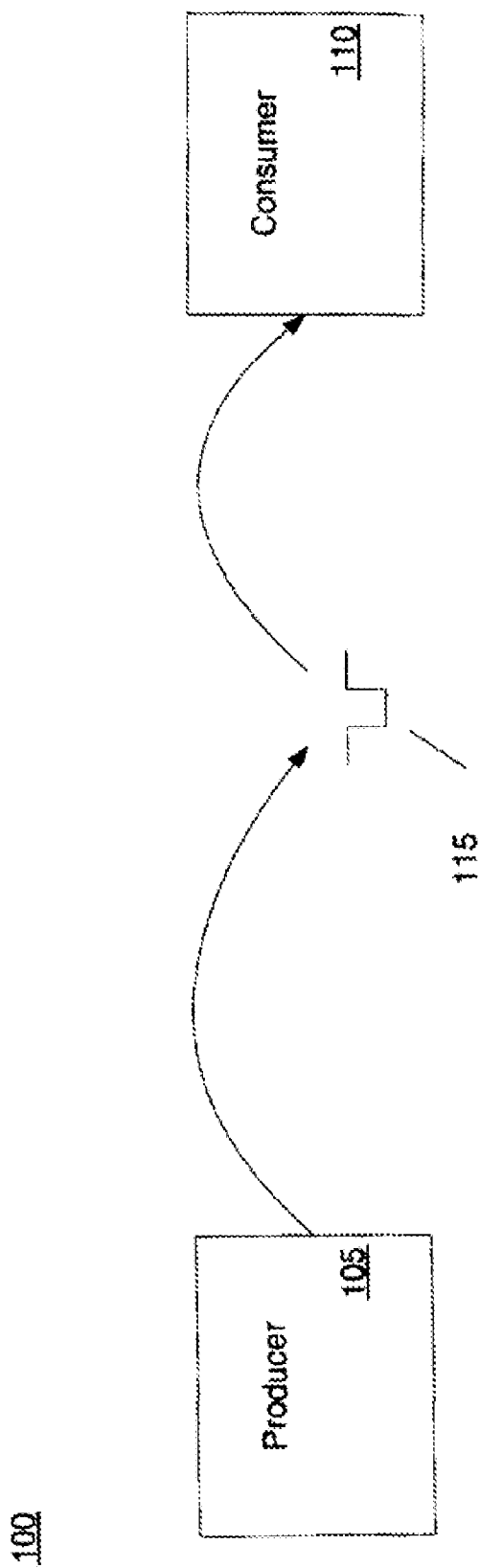
FIG. 1 is a block diagram of a producer and a single consumer instance.
Figure 2:
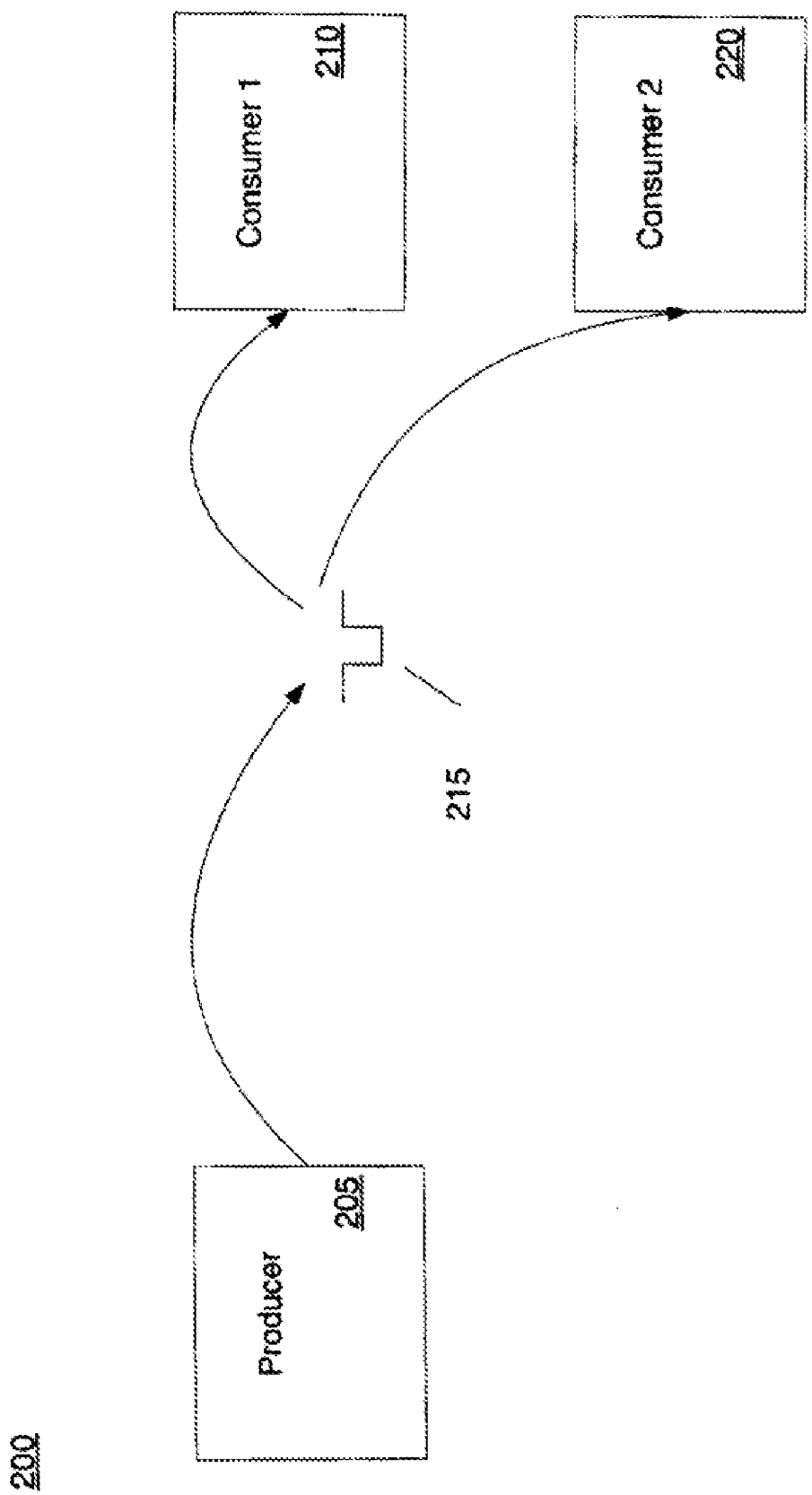
FIG. 2 is a block diagram of a producer and multiple consumer instances.
Figure 3:
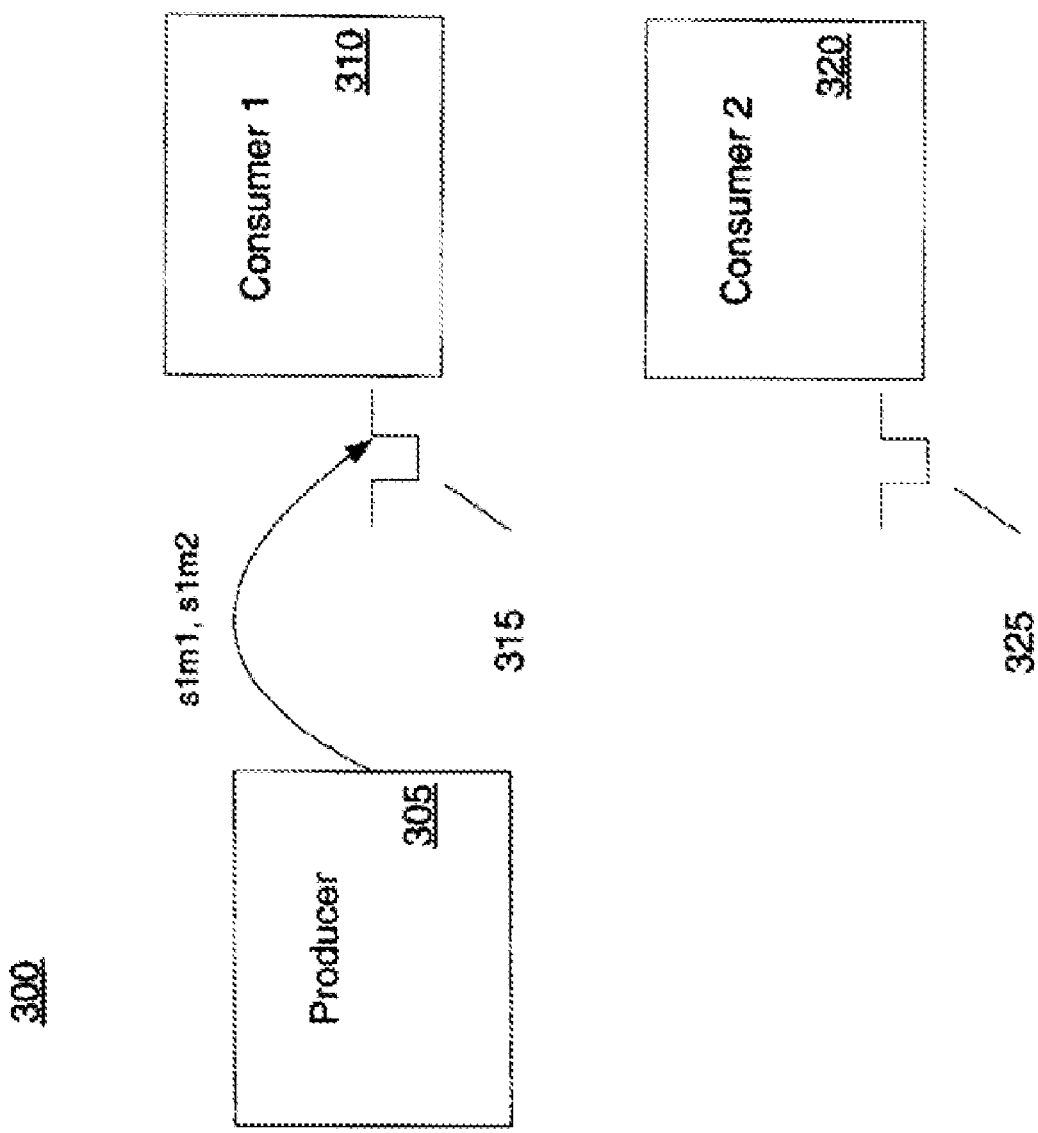
FIG. 3 is a more detailed block diagram of a producer and multiple consumer instances.

A first embodiment will now be described with reference to FIGS. 3 and 4. In a first example, in FIG. 4, preferably, steps 400 to 450 are executed by a main thread associated with a producer (305) termed herein as "a producer (305)". Preferably, steps 455 to 480 are executed by a parallel producer thread that executes in parallel to the producer (305). In FIG. 3, there is shown an asynchronous messaging system (300) comprising a producer (305), that generates (step 400) at least one message (e.g. in response to an event). In a first example, the messages are associated with database operations against rows of a database (e.g. "insert", "update", "delete" etc.). Preferably, message order is preserved for messages generated by a single instance of a producer.

The system (300) also includes a plurality of consumers clustered among a corresponding plurality of systems, namely, Consumer 1 (310) with an associated queue (315) and Consumer 2 (320) with an associated queue (325). Individual installations of a consumer are known as instances (i.e. Consumer 1 is an instance and Consumer 2 is an instance). In the first embodiment, each consumer instance processes a message, without forwarding the message onto another consumer.

Typically, an asynchronous messaging application executes on the same system as each instance of a producer and a consumer.

In a first embodiment, the producer (305) tags (step 405) each message with a sequence identifier and a sequence number. A sequence number is unique within a sequence identified by a sequence identifier and the value of the sequence number increases with time. In one example, a sequence identifier is unique to a producer (e.g. wherein the sequence identifier is unique to a task), such that more than one producer does not generate messages having the same sequence identifier. In another example, a sequence identifier can be unique to a producer and also unique to a consumer, such that more than one consumer does not receive messages having the same sequence identifier.

In the first example, each database row has an associated sequence identifier and the producer (305) generates two messages. Thus, the ordering requirement can then be stated as follows: for a first message s1m1 (wherein "s1" is the sequence identifier; "m1" is the sequence number and "insert row 1" is the message payload) and a second message s1m2 (wherein "s1" is the sequence identifier, "m2" is the sequence number and "update row 1" is the message payload), s1m1 must be processed before s1m2 because s1m1 has a sequence number that is less than the sequence number of s1m2.

The task of generating appropriate sequence identifiers and sequence numbers can alternatively be performed either by the messaging application or by a combination of the producer and the messaging application. In the latter embodiment, a producer can specify a non-unique sequence identifier (e.g. a customer id—wherein more than one producer uses the customer id) and then the messaging application can qualify the sequence identifier such that the sequence identifier is unique to the producer. In yet another embodiment, multiple producers can collaborate to determine sequence identifiers unique to each producer.

The producer (305) includes a selecting component for selecting a consumer instance to which to send the first message, s1m1, for processing. Alternatively, the messaging application can select a consumer instance based on load balancing techniques, availability requirements etc.

In the first example, the producer (305) selects Consumer 1 (310) and sends (step 410) s1m1 to the queue (315) associated with Consumer 1 (310). The producer (305) logs (step 415) message data associated with s1m1 in a log.

In the first example, the sequence identifier (i.e. s1) and the sequence number of the most recent message that was sent (i.e. m1) are logged. Alternatively, in addition, the message payload can also be logged. The producer (305) also logs (step 415) consumer data associated with Consumer 1 (310) (i.e. an identifier associated with Consumer 1—in the first example, the identifier is "C1"). A representation of the log is shown in Table 1 in FIG. 7.

Preferably, the log associated with a producer is not persistent (i.e. written to disk) since there is no requirement to preserve message order between different instances of a producer. For example, a sequence identifier will be unique to a producer instance. Thus, if one instance of a producer finishes (e.g. crashes or ends normally) then, on re-start, a new instance of a producer is executed. Since there is no requirement to preserve message order between different instances of a producer, the new instance of a producer uses a new sequence identifier to the sequence identifier used by the previous instance of a producer and a producer instance does not need to persist any data across instances of the producer. Messages associated with the previous instance of the producer will still be processed.

Alternatively, the log associated with a producer can be persistent (i.e. written to disk) in order to allow the producer to recover after failure. This allows the producer to continue without loss of sequencing. A producer can use this technique if the producer is generating messages in response to an external event.

Next, the parallel producer thread associated with the producer (305) waits (step 455) for an acknowledgement from Consumer 1 (310) that s1m1 has been processed. In the first example, an acknowledgement for a message having a particular sequence number y, serves to also acknowledge every message having a sequence number of y or less.

It should be understood that the parallel producer thread can continuously execute in parallel, or can be invoked when an acknowledgement is to be received.

In the first example, while the parallel producer thread is waiting for an acknowledgement from Consumer 1 (310) that s1m1 has been processed; the producer (305) determines (step 425) whether there are any further messages to be sent for processing having a matching sequence identifier to the first message. In response to a determination that there are no further messages to be sent for processing, the parallel producer thread continues to wait (step 455) for an acknowledgement from Consumer 1 (310) that s1m1 has been processed.

In the first example, the producer (305) determines that there is another message (i.e. a second message s1m2) to be sent for processing. Thus, in response to a determination that there are further messages to be sent for processing, the producer (305) determines the sequence identifier (i.e. s1) associated with the further message. The producer (305) utilizes the sequence identifier to check its log (step 430) in order to determine (step 435) whether there is a record having a matching sequence identifier. In response to a determination that there are no records having a matching sequence identifier, the producer sends (step 410) the further message to a consumer.

In the first example, the producer (305) determines that there is a record having a matching sequence identifier (i.e. the record in Table 1 having a sequence identifier "s1") and thus, in response to a determination that there is a record having a matching sequence identifier, the producer (305) determines (step 440) the associated consumer data (i.e. "C1"). Note, that the producer (305) determines that there is a log record having a matching sequence identifier in the log, because since the parallel producer thread is waiting for an acknowledgement from Consumer 1 (310) that s1m1 has been processed, the log record has not yet been purged.

The producer (305) then sends (step 445) s1m2 to the queue of the consumer associated with the determined consumer data (i.e. the queue (315) associated with Consumer 1 (310)). It should be understood that Consumer 1 (310) is the same consumer instance that is processing the first message, s1m1, wherein s1m1 has the same sequence identifier as the second message, s1m2. The producer (305) logs (step 450) message data associated with s1m2. In the first example, the data in the sequence identifier field (i.e. s1) represented in Table 1 remains the same; the data in the sequence number field is overwritten (i.e. m1 is overwritten with m2) since m2 is sequence number of the most recent message that was sent and the data in the consumer identifier field (i.e. C1) represented in Table 1 remains the same.

A representation of the updated producer log is shown in Table 2 in FIG. 7.

In response to logging (step 450) data, the producer (305) determines (step 425) whether there are any more messages to be sent for processing having a matching sequence identifier to the first message. In the first example, the producer (305) determines that there are no further messages to be sent for processing and the parallel producer thread continues to wait (step 455) for acknowledgements from Consumer 1 (310) that s1m1 and s1m2 have been processed.

In the first example, Consumer 1 (310) processes s1m1 and then processes s1m2 (wherein the order for processing is specified by the order in which the messages arrive on the queue (315)). After s1m2 has been processed, Consumer 1 (310) generates and sends an acknowledgement to the parallel producer thread, acknowledging that s1m2 has been processed. Since in the first example, an acknowledgement for a message having a particular sequence number serves to also acknowledge every message having a lower sequence number, the acknowledgement also acknowledges that s1m1 has been processed.

It should be understood that alternatively, the messaging application can generate and transmit acknowledgments on behalf of a consumer instance.

The parallel producer thread makes a determination (step 460) as to whether any acknowledgments have been received. If no acknowledgments are received, a generator generates (step 470) an alert, for example, so that a systems administrator can execute analysis (e.g. the systems administrator can force a purge of log records associated with outstanding messages associated with a sequence identifier).

In the first example, the parallel producer thread makes a determination (step 460) that an acknowledgment has been received (e.g. wherein the parallel producer thread can wait for acknowledgements for a pre-determined time).

In response to receiving the acknowledgment, the parallel producer thread checks (step 465) the log in order to determine (step 475) whether the producer (305) can "forget" log records associated with the outstanding messages associated with the sequence identifier. That is, the parallel producer thread compares the sequence identifier and associated sequence number in the acknowledgement with the sequence identifier data and associated sequence number data in the log records.

If an acknowledgment has not been received for each outstanding message associated with a particular sequence identifier that was sent, a generator produces (step 470) an alert.

If an acknowledgment has been received for each outstanding message associated with a particular sequence identifier that was sent, the parallel producer thread purges (step 480) the log records associated with the sequence identifier of the messages that have been processed (i.e. the log record in Table 2 associated with s1m2 (and hence associated with s1m1)).

In the first example, the acknowledgement for s1m2 (and hence s1m1) is compared against the log (as represented in Table 2). The sequence identifier of the acknowledgment matches the sequence identifier data in the log record. The sequence number of the acknowledgment matches the most recent sequence number data of the log record and thus, since the acknowledgment also acknowledges processing of every message with a sequence number of less than 2 in m2, the acknowledgment also acknowledges processing of m1 (i.e. wherein m1 has a sequence number of 1, which is less than 2).

Thus the parallel producer thread purges (step 480) the log record associated with the sequence identifier of the messages that have been processed (i.e. the log record in Table 2 associated with s1m2 (and hence s1m1)).

It should be understood that the assignment of a sequence identifier and a sequence number to a message allows for an acknowledgment associated with that message to be identified (i.e. by comparing the sequence identifier and sequence number in the message to a sequence identifier and sequence number in the acknowledgement). It should be understood that a consumer guarantees order in its processing of messages because a single consumer processes messages in the order in which they are received on the single consumer's queue.

Next, the producer (305) generates (step 400) a third message and tags (step 405) the message with a sequence identifier and a sequence number (in the first example—s1m3). The producer (305) selects a consumer instance to which to send the third message, s1m3 for processing. In the first example, the producer (305) selects Consumer 2 (320) and sends (step 410) s1m3 to the queue (325) associated with Consumer 2 (320). The producer (305) logs (step 415) message data associated with s1m3—in the first example, the sequence identifier (i.e. s1) and the sequence number of the most recent message that was sent (i.e. m3) are logged. The producer (305) also logs (step 415) consumer data associated with Consumer 2 (310) (i.e. an identifier associated with Consumer 2—in the first example, the identifier is "C2"). A representation of the producer log is shown in Table 3 in FIG. 7.

Next, the parallel producer thread waits (step 455) for an acknowledgement from Consumer 2 (310) that s1m3 has been processed. In the first example, while the parallel producer thread is waiting for an acknowledgement from Consumer 2 (310) that s1m3 has been processed; the producer (305) determines whether there are any further messages to be sent for processing having a matching sequence identifier to the third message. In the first example, as there are no further messages to be sent for processing, the parallel producer thread continues to wait (step 455) for an acknowledgement for Consumer 2 (310) that s1m3 has been processed as described above.

In the first example, Consumer 2 (320) processes s1m3 and generates and sends an acknowledgement to the parallel producer thread, acknowledging that s1m3 has been processed.

The parallel producer thread makes a determination (step 460) as to whether any acknowledgments have been received. If no acknowledgments are received, a generator generates (step 470) an alert.

In the first example, the parallel producer thread makes a determination (step 460) that an acknowledgment has been received. In response to receiving the acknowledgment, the parallel producer thread checks (step 465) the log in order to determine (step 475) whether the producer (305) can "forget" log records associated with the outstanding messages associated with the sequence identifier as described above.

In the first example, the acknowledgement for s1m3 is compared against the log (as represented in Table 3). The sequence identifier of the acknowledgment matches the sequence identifier data in the log record. The sequence number of the acknowledgment matches the most recent sequence number data of the log record. Thus the parallel producer thread purges (step 480) the log record associated with the sequence identifier of the message that has been processed (i.e. the log record in Table 3 associated with s1m3).

Thus, a producer is configurable to send all messages outstanding in the system having the same sequence identifier to the same instance of a consumer. This allows order to be preserved within the sequence, since a single consumer processes the messages in the order in which the messages arrive on its associated queue.

Furthermore, only when acknowledgements for each outstanding message (i.e. m1, m2) having the same sequence identifier (i.e. s1) that has been sent to the same instance of a consumer (i.e. C1) have been received, can a producer (305) "forget" that it has already chosen a consumer for any given sequence. The producer (305) can then select a new consumer instance (i.e. C2) next time it sees a message (i.e. m3) in that sequence (i.e. s1). It should be understood that if a producer instance fails before receiving all acknowledgments for each outstanding message, the outstanding messages still get processed, but acknowledgments will not be sent back to the producer instance (because upon re-start, the producer instance is a new producer instance).

Thus, for each sequence identifier having outstanding messages in the system, a route from a producer to a consumer is built up, which is reused while messages are outstanding in the system but is destroyed (and potentially later rebuilt) when messages in the sequence are no longer being processed.

Thus, when a particular sequence has no outstanding messages, the preferred embodiment allows a new route to be built. Advantageously, the preferred embodiment allows for routing around any failed consumers in the system and helps maintain high-availability. Furthermore, should one of the consumers fail, only those messages associated with a sequence identifier that the failed consumer was processing at the time of failure will continue to be routed to the failed consumer (unless for example, a systems administrator intervenes and forces a purge of log records associated with outstanding messages associated with a sequence identifier). Messages associated with another sequence identifier can safely be routed around the failure, without compromising the message order requirement.

Advantageously, the feature of forgetting a sequence once the current consumer instance has processed messages sent to it so far, means that the producer (305) does not build up an ever-increasing log of sequence identifiers and associated consumer identifiers.

It should be understood that in the preferred embodiment all messages associated with a particular sequence identifier need not be processed by the same consumer instance, but they should be processed in a particular order. That is, messages are sent to the same consumer instance only when previous messages associated with a sequence identifier have been sent to the consumer instance but have not yet been processed by the consumer instance.

It should be understood that an acknowledgement can be generated for every message processed. However, generation and receipt of acknowledgements can be optimized. As described above, in one example, a single acknowledgement for s(x), m(y) serves to acknowledge all messages with a sequence identifier of x and a sequence number of y or less. In another example, acknowledgement generation can be skipped such that an acknowledgment is generated for every other message processed. In yet another example, acknowledgment generation can be delayed (e.g. until a time when more bandwidth is available). In yet another example, an acknowledgement can be sent for a batch of messages in accordance with a timeout from receiving a first message in a batch. In yet another example, the messaging application can be configurable to determine whether further messages associated with a sequence identifier have been routed to a consumer instance but have yet to be processed. The messaging application can then be configurable to discard acknowledgements generated for sequence identifier which has outstanding messages waiting for the consumer instance until an acknowledgement for the last outstanding message has been generated. Alternatively, the messaging application can invoke the consumer instance to generate an acknowledgment (s) only when all outstanding messages have been processed.

By preventing generation of an acknowledgment for every message processed, although further messages associated with a sequence identifier cannot be sent to another consumer instance (and thus, further messages cannot be routed around a failed consumer instance) until all appropriate acknowledgments are received and although a consumer instance may not be available when an acknowledgment needs to be generated, advantageously, this feature improves performance and minimizes overhead associated with acknowledgment generation and transmission.

In another optimization example, acknowledgments can be non-persistent messages. Persistent messages (which a messaging system guarantees not to lose) must be written to disk and are therefore an overhead. Furthermore, extra network usage is required when handling persistent messages (e.g. it may be required that an acknowledgement needs to be sent from a receiver that receives a persistent message to the sender of the persistent message). Thus, should an acknowledgement for a message associated with a particular sequence identifier become lost, a further (non-outstanding) message associated with the particular sequence is still sent to the same consumer instance and so on until appropriate acknowledgements are received. This optimization feature may not be suitable for a sequence wherein messages are generated sparsely, since it may take time until a further (non-outstanding) message is generated and appropriate acknowledgements are received—thus, delaying the purging of log records associated with that sequence identifier.

A second embodiment will now be described with reference to FIGS. 4-6. In a second example, in FIG. 6, steps 600 to 660 are executed by a main thread associated with Intermediary 1 (510) termed herein as "Intermediary 1 (510)".

Preferably, steps 665 to 695 are executed by a parallel intermediary thread that executes in parallel to Intermediary 1 (510).

Figure 5:
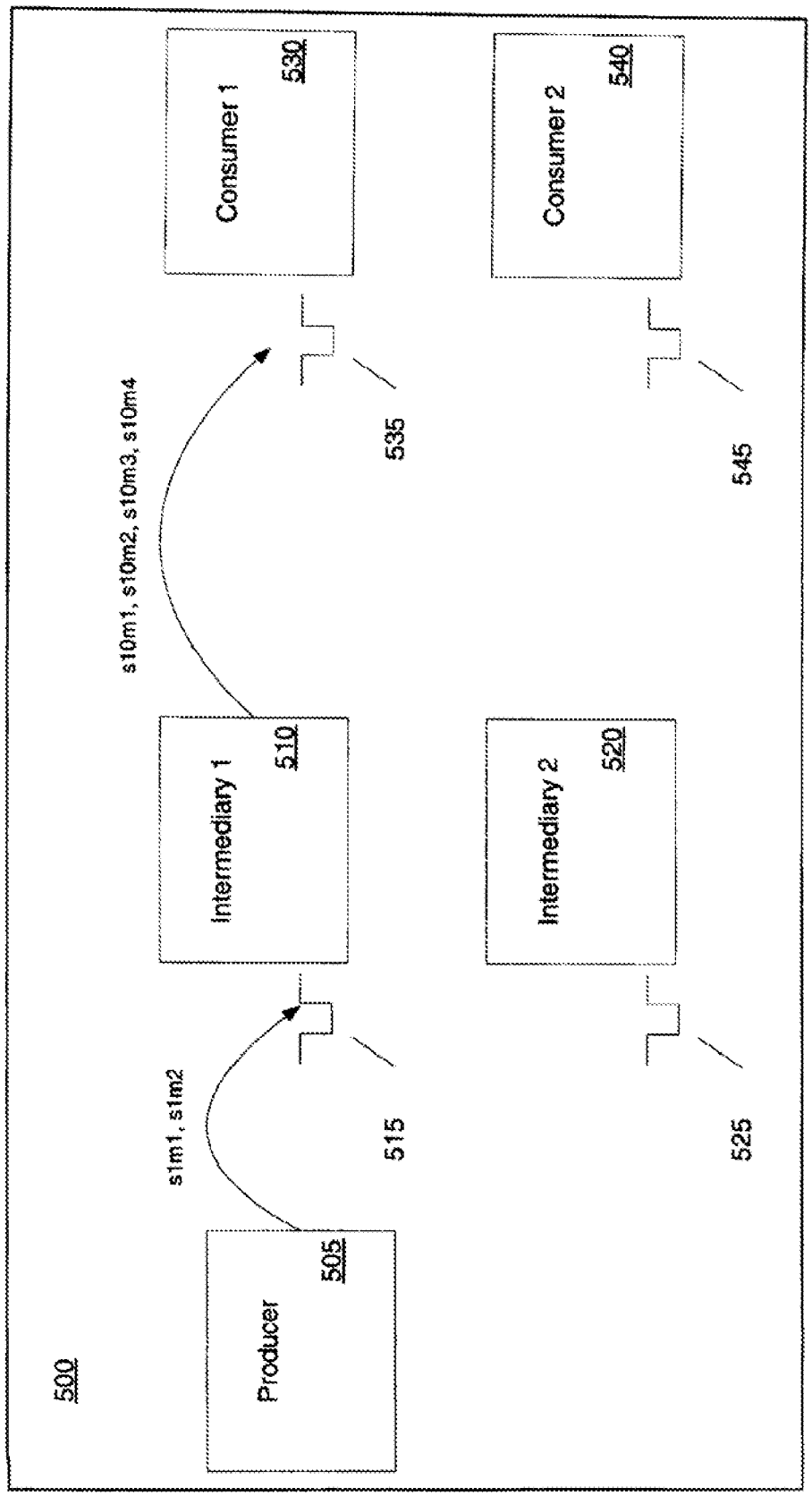
FIG. 5 is a block diagram of a producer, multiple intermediary instances and multiple consumer instances.

In FIG. 5, there is shown an asynchronous messaging system (500) comprising a producer (505) which generates at least one inbound message (e.g. in response to an event). The term "inbound" herein refers to inbound to an intermediary. The system (500) also comprises a plurality of intermediaries clustered among a corresponding plurality of systems, namely, Intermediary 1 (510) with an associated queue (515) and Intermediary 2 (520) with an associated queue (525). The system (500) also comprises a plurality of consumers clustered among a corresponding plurality of systems, namely, Consumer 1 (530) with an associated queue (535) and Consumer 2 (540) with an associated queue (545). Individual installations of an intermediary or consumer are known as instances.

Typically one type of intermediary can generate one or more outbound messages in response to an inbound message, wherein the term "outbound" herein refers to outbound to a consumer. Another type of intermediary can transform an inbound message from a producer and send the transformed message on to a consumer. For example, time data in a message is converted from British Summer Time (BST) to Greenwich Mean Time (GMT). Another type of intermediary can route inbound messages between different consumers. Particularly complex intermediaries can perform all of these operations.

In the second example, an intermediary instance processes an inbound message and in response, introduces a plurality of outbound messages into the messaging network and can route these outbound messages to a consumer. In the second example, each consumer instance processes one or more outbound messages, without forwarding any outbound messages onto another consumer.

Typically, an asynchronous messaging application executes on the same system as each instance of a producer, an intermediary and a consumer.

In the second example, the producer (505) generates (step 400) two inbound messages, wherein the inbound messages are associated with database operations against rows of a database (e.g. "insert", "update", "delete" etc.).

The producer (505) tags (step 405) each inbound message with a sequence identifier and a sequence number (wherein a sequence number is unique within a sequence identified by a sequence identifier and wherein the value of the sequence number increases with time).

In the second example, each database row has an associated sequence identifier. Thus, the ordering requirement can then be stated as follows: for a first inbound message s1m1 (wherein "s1" is the sequence identifier; "m1" is the sequence number and "insert row 1" is the message payload) and a second inbound message s1m2 (wherein "s1" is the sequence identifier; "m2" is the sequence number and "update row 1" is the message payload), s1m1 must be processed before s1m2 because s1m1 has a sequence number that is less than the sequence number of s1m2.

The producer (505) comprises a selecting component for selecting an intermediary instance to which to send the first inbound message, s1m1 for processing. Alternatively the messaging application can select an intermediary instance based on load balancing techniques, availability requirements etc.

In the second example, the producer (505) selects Intermediary 1 (510) and sends (step 410) s1m1 to the queue (515) associated with Intermediary 1 (510). The producer (505) logs (step 415) message data associated with s1m1 in a log—in the second example, the sequence identifier (i.e. s1) and the sequence number of the most recent inbound message that was sent (i.e. m1) are logged. The producer (505) also logs (step 415) intermediary data associated with Intermediary 1 (510) (i.e. an identifier associated with Intermediary 1—in the second example, the identifier is "I1"). A representation of the log is shown in Table 4 in FIG. 8.

Preferably, the log associated with a producer is not persistent (i.e. written to disk).

The parallel producer thread associated with the producer (505) waits (step 455) for an acknowledgement from intermediary 1 (510) that s1m1 has been processed.

Figure 6:
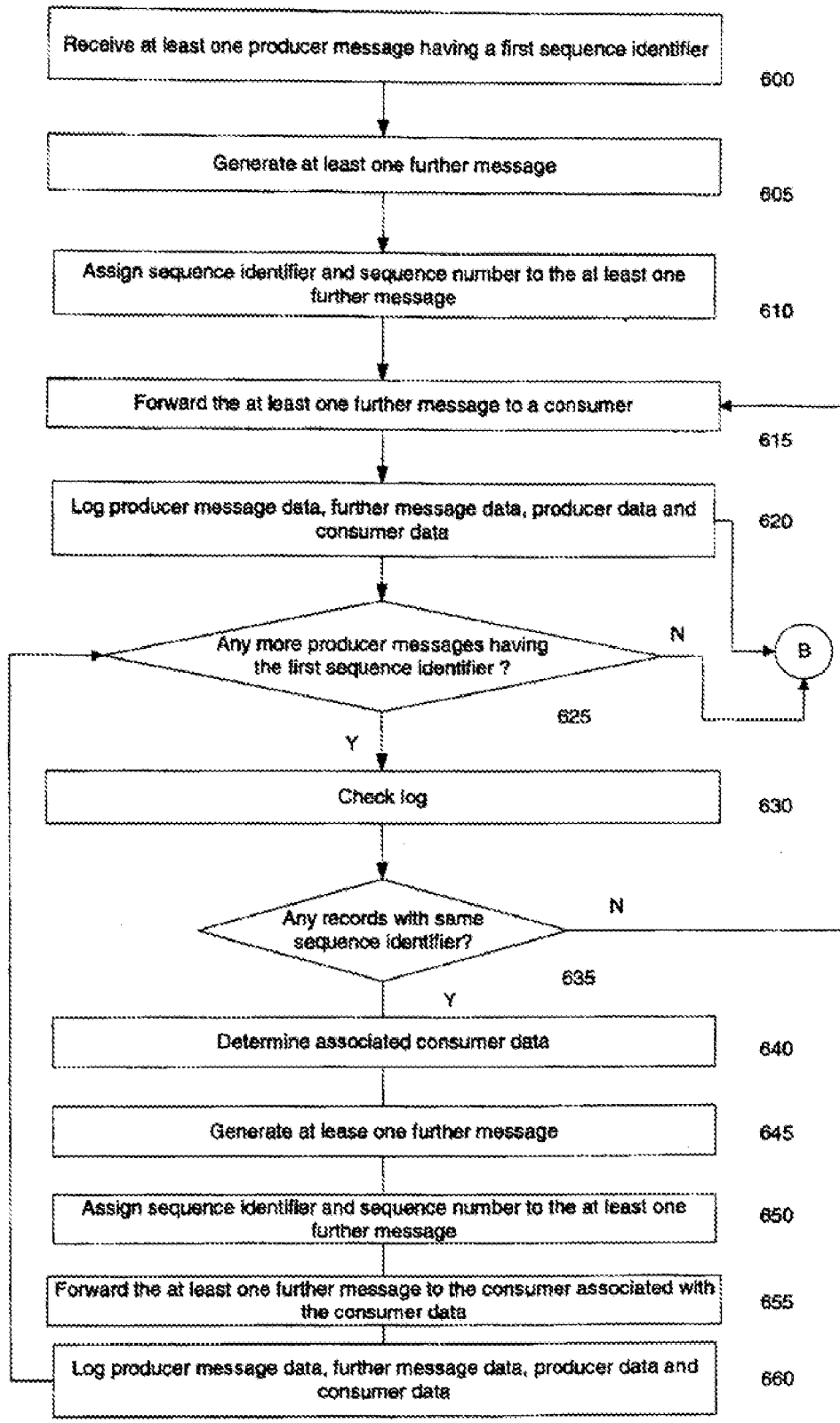
FIG. 6 is a flow chart showing the operational steps involved in a process executed by an intermediary.
Figure 6:
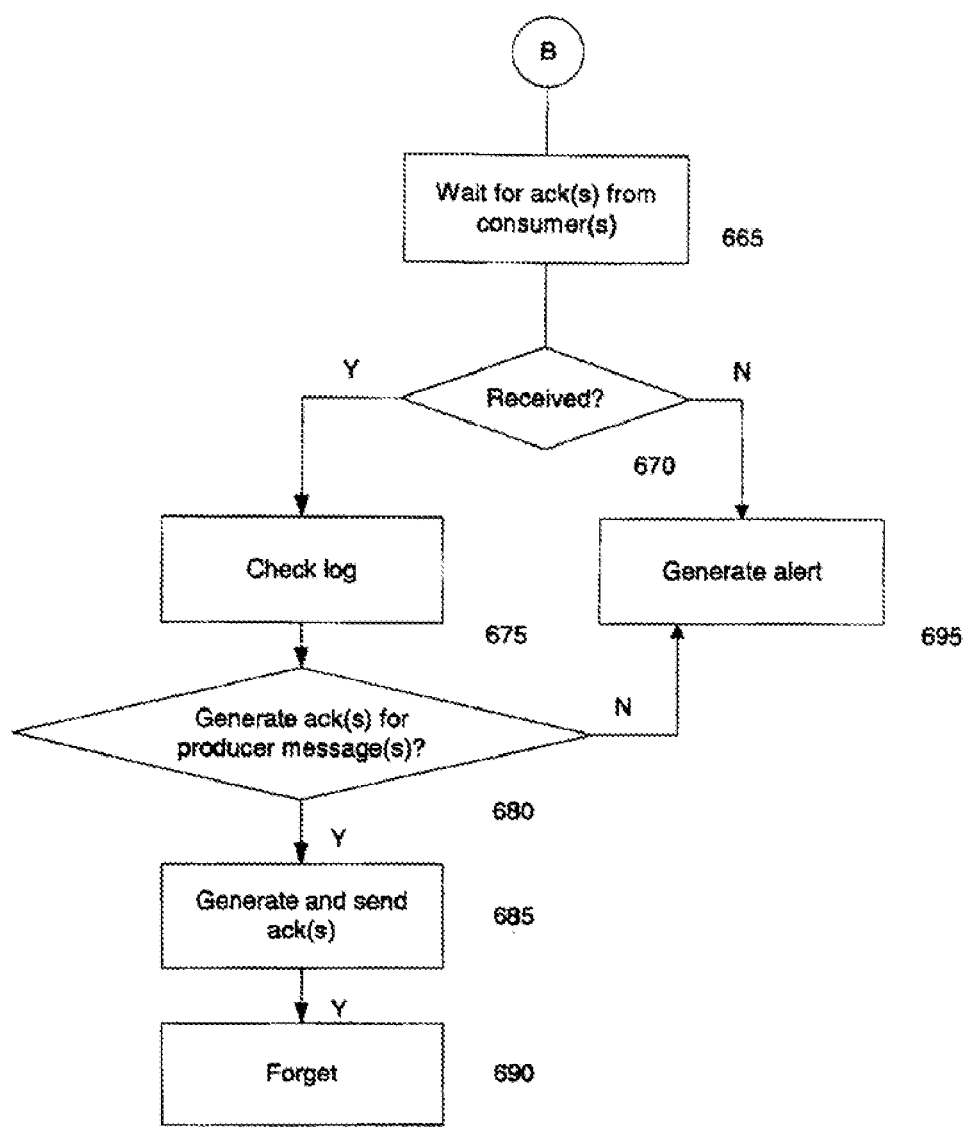

With reference to FIG. 6, in response to receiving (step 600) an inbound message, s1m1, Intermediary 1 (510) generates (step 605) two outbound messages. Intermediary 1 (510) maps the inbound sequence identifier and associated inbound sequence number with an outbound sequence identifier and at least one associated outbound sequence number.

In the second example, Intermediary 1 (510) tags (step 610) each outbound message with an outbound sequence identifier that is associated with the inbound sequence identifier. Alternatively, the outbound sequence identifier can be the same as the inbound sequence identifier. Intermediary 1 (510) tags (step 610) each outbound message with an outbound sequence number that is associated with the inbound sequence number. The outbound sequence number is unique within a sequence identified by the outbound sequence identifier and the value of the outbound sequence number increases with time.

In the second example, for the first inbound message s1m1, a first outbound message s10m1 is generated (wherein "s10" is the outbound sequence identifier; "m1" is the outbound sequence number and "go to database A" is the message payload) and a second outbound message s10m2 is generated (wherein "s10" is the outbound sequence identifier; "m2" is the outbound sequence number and "insert row 100" is the message payload). s10m1 must be processed before s10m2 because s10m1 has an outbound sequence number that is less than the outbound sequence number of s10m2.

Intermediary 1 (510) includes a selecting component for selecting a consumer instance to which to send the first and second outbound messages for processing. Alternatively the messaging application can select a consumer instance based on load balancing techniques, availability requirements etc.

In the second example, Intermediary 1 (510) selects Consumer 1 (530) for processing the outbound messages (i.e. s10m1 and s10m2) and sends (step 615) s10m1 and s10m2 to the queue (535) associated with Consumer 1 (530).

Intermediary 1 (510) forcibly logs (step 620) message data associated with s1m1 in a log. In the second example, Intermediary 1 (510) logs: the sequence identifier of the first inbound message (i.e. s1); the sequence identifier of the first and second outbound messages (i.e. s10); the inbound sequence number of the most recent inbound message that was sent (i.e. m1); producer data associated with the producer that generated the first inbound message (e.g. an identifier associated with the producer (505)—in the second example, the identifier is "P1"); the outbound sequence number of the most recent outbound message that was sent (i.e. m2) and consumer data associated with the consumer that is processing the outbound messages (e.g. an identifier associated with Consumer 1 (530)—in the second example, the identifier is "C1"). A representation of the log is shown in Table 5 in FIG. 9.

The log associated with an intermediary is persistent (i.e. written to disk) even across instances of an intermediary. This is because, in the event of failure, an intermediary needs to guarantee that messages will be processed and that the messages will be processed in the correct order.

For example, an intermediary forwards a first message associated with a particular sequence identifier to a selected consumer and subsequently crashes. The consumer has not yet processed the first message (and therefore the consumer has not sent back an acknowledgement). The intermediary recovers and then receives a second message associated with the particular sequence identifier. Since the consumer has not yet acknowledged processing of the first message, the intermediary must forward the second massage to the same selected consumer (even though the selection was made during the previous instance of the intermediary. The log is used to store data associated with a selection, across instances of an intermediary.

When an intermediary is re-run, it does not use new sequence identifiers (unlike a producer, which can use new sequence identifiers when re-run as described above).

The parallel intermediary thread waits (step 665) for acknowledgements from Consumer 1 (530) that s10m1 and S10m2 have been processed.

Figure 4:
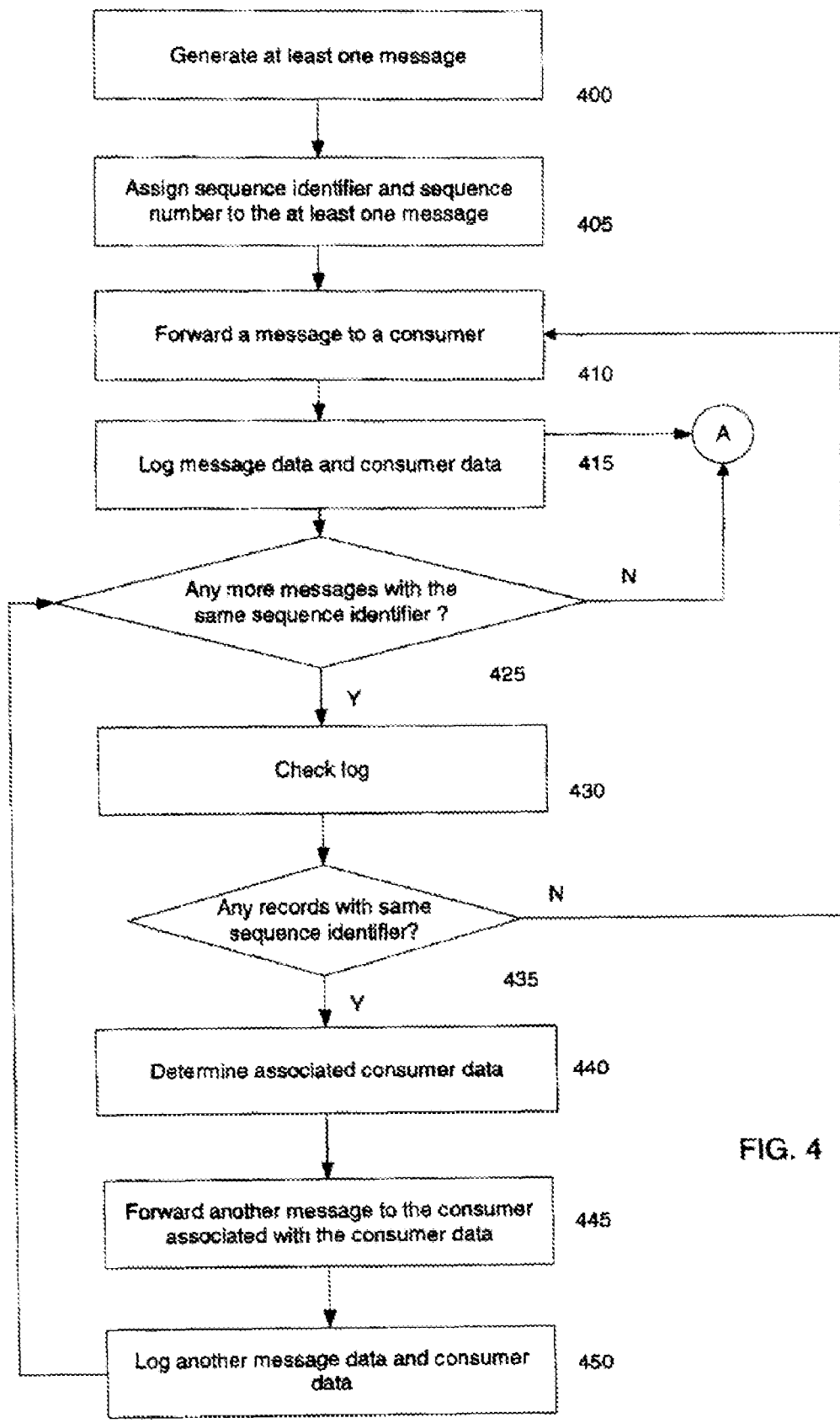
FIG. 4 is a flow chart showing the operational steps involved in a process executed by a producer.
Figure 4:
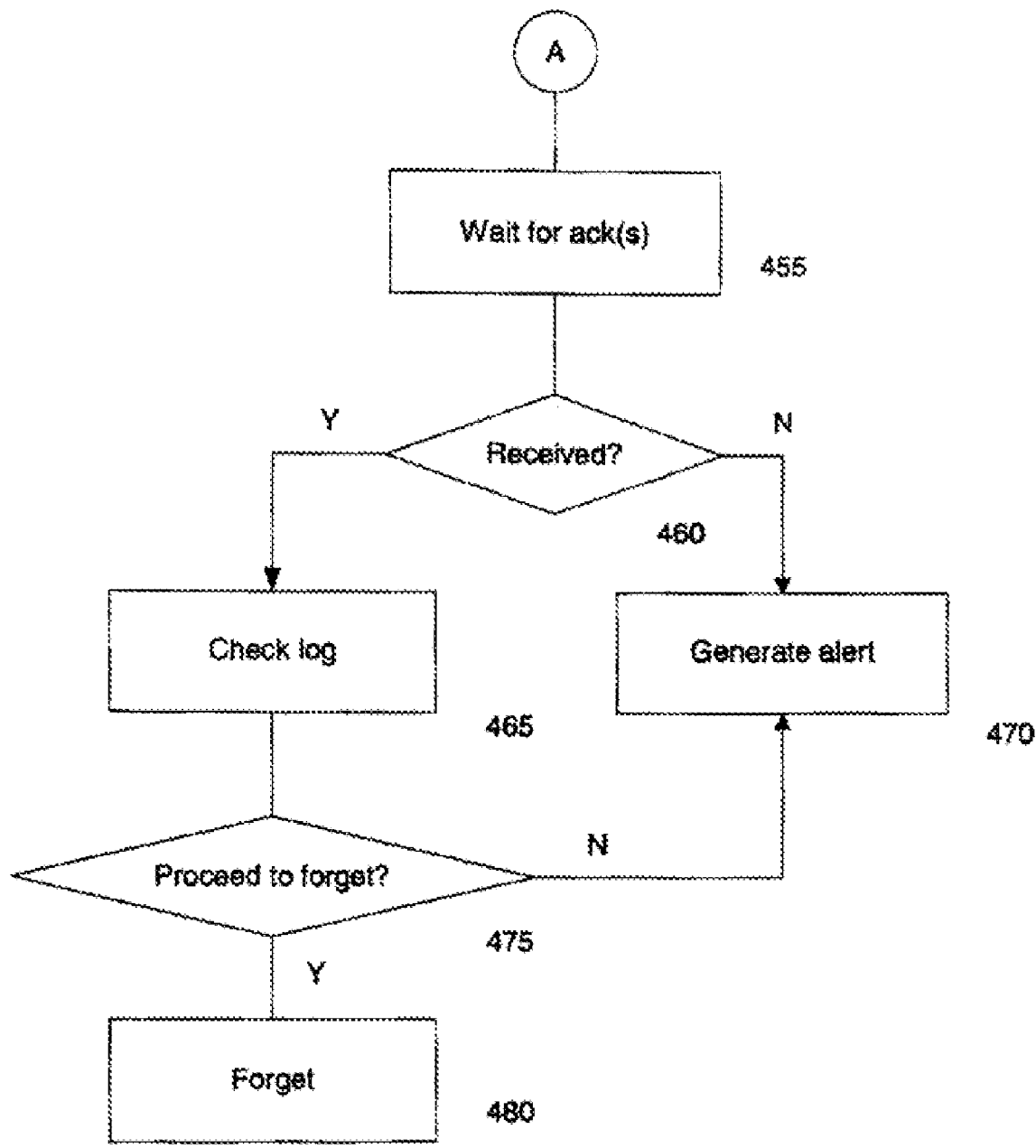

With reference to FIG. 4, in the second example, while the parallel producer thread is waiting for an acknowledgement from Intermediary 1 (510) that s1m1 has been processed, the producer (505) determines (step 425) whether there are any further inbound messages to be sent for processing having a matching sequence identifier to the first inbound message. In response to a determination that there are no further inbound messages to be sent for processing, the parallel producer thread continues to wait (step 455) for an acknowledgement from Intermediary 1 (510) that s1m1 has been processed.

In the second example, the producer (505) determines that there is a further inbound message (i.e. a second inbound message s1m2) to be sent for processing, thus, in response to a determination that there are further inbound messages to be sent for processing, the producer (505) determines the sequence identifier (i.e. s1) associated with the second inbound message. The producer (505) utilizes the sequence identifier to check its log (step 430) in order to determine (step 435) whether there is a record having a matching sequence identifier. In response to a determination that there are no records having a matching sequence identifier, the producer (505) sends (step 410) the further message to a consumer.

In the second example, the producer (505) determines that there is a record having a matching sequence identifier (i.e. the record in Table 4 having a sequence identifier "s1") and thus, in response to a determination that there is a record having a matching sequence identifier, the producer (505) determines (step 440) the associated intermediary data (i.e. "I1"). Note, that the producer (505) determines that there is a log record having a matching sequence identifier in the log, because since the parallel producer thread is waiting for an acknowledgement from Intermediary 1 (510) that s1m1 has been processed, the log record has not yet been purged.

The producer (505) then sends (step 445) s1m2 to the queue of the intermediary associated with the determined intermediary data (i.e. the queue (515) associated with Intermediary 1 (510)). It should be understood that Intermediary 1 (510) is the same intermediary instance that is processing the first inbound message, s1m1, wherein s1m1 has the same sequence identifier as the second inbound message, s1m2.

The producer (505) logs (step 450) message data associated with s1m2. In the second example, the data in the sequence identifier field (i.e. s1) represented in Table 4 remains the same; the data in the sequence number field is overwritten (i.e. m1 is overwritten with m2) since m2 is sequence number of the most recent inbound message that was sent and the data in the intermediary identifier field (i.e. I1) represented in Table 4 remains the same. A representation of the updated producer log is shown in Table 6 in FIG. 8.

In response to logging (step 450) data, the producer (505) determines (step 425) whether there are any further inbound messages to be sent for processing having a matching sequence identifier to the first inbound message. In the second example, the producer (505) determines that there are no further inbound messages to be sent for processing and the parallel producer thread continues to wait (step 455) for acknowledgements from Intermediary 1 (510) that s1m1 and s1m2 have been processed.

With reference to FIG. 6, while the parallel intermediary thread is waiting for an acknowledgement from Consumer 1 (530) that s10m1 and s10m2 have been processed, Intermediary 1 (510) determines (step 625) whether there are any further inbound messages to be sent for processing having a matching sequence identifier to the first inbound message (i.e. s1m1). In response to a determination that there are no further inbound messages to be sent for processing, the parallel intermediary thread continues to wait (step 630) for an acknowledgement from Consumer 1 (530) that s10m1 and s10m2 have been processed.

In the second example, intermediary 1 (510) determines that there is a further inbound message (i.e. a second inbound message, s1m2) in its queue (515) to be sent for processing. Thus, in response to a determination that there are further inbound messages to be sent for processing, Intermediary 1 (510) determines the sequence identifier (i.e. s1) associated with the second inbound message. Intermediary 1 (510) utilizes the sequence identifier to check (step 630) its log in order to determine (step 635) whether there is a record having a matching sequence identifier. In response to a determination that there are no records having a matching sequence identifier, Intermediary 1 (510) sends (step 615) the further inbound message to a consumer.

In the second example, Intermediary 1 (510) determines that there is a record having a matching sequence identifier (i.e. the record in Table 5 having a sequence identifier "s1") and thus, in response to a determination that there is a record having a matching sequence identifier, Intermediary 1 (510) determines (step 640) the associated consumer data (i.e. "C1").

Note, that Intermediary 1 (510) determines that there is a log record having a matching sequence identifier in the log because since the parallel intermediary thread is waiting for acknowledgements from Consumer 1 (530) that s10m1 and s10m2 have been processed, the log record has not yet been purged.

In response to receiving s1m2, Intermediary 1 (510) generates (step 645) to outbound messages. Intermediary 1 (510) maps the inbound sequence identifier and associated inbound sequence number with an outbound sequence identifier and at least one associated outbound sequence number.

In the first example, Intermediary 1 (510) tags (step 650) each outbound message with an outbound sequence identifier that is associated with the inbound sequence identifier and an outbound sequence number that is associated with the inbound sequence number. The outbound sequence number is unique within a sequence identified by the outbound sequence identifier and the value of the outbound sequence number increases with time.

In the second example, for the second inbound message, s1m2, a third outbound message s10m3 is generated (wherein "s10" is the sequence identifier; "m3" is the sequence number and "go to database B" is the message payload) and a fourth further message s10m4 is generated (wherein "s10" is the sequence identifier; "m4" is the sequence number and "update row 75" is the message payload). s10m3 must be processed before s10m4 because s10m3 has a sequence number that is less than the sequence number of s10m4. Furthermore, the value of the sequence number for the third outbound message associated with the second inbound message (i.e. 3 in s10m3) must be more than the value of the sequence number for the second outbound message associated with the first inbound message (i.e. 2 in s10m2) to preserve order.

Intermediary 1 (510) then sends (step 655) s10m3 and s10m4 to the queue of the consumer associated with the determined consumer data (i.e. the queue (535) associated with Consumer 1 (530)). It should be understood that Consumer 1 (530) is the same consumer instance that is processing the first and second outbound messages (i.e. s10m1 and s10m2), wherein s10m1 and s10m2 have the same sequence identifier as the third and fourth outbound messages, s10m3 and s10m4.

Intermediary 1 (510) forcibly logs (step 660) message data associated with s1m2 in a log. In the second example, Intermediary 1 (510) logs: the sequence identifier of the second inbound message (i.e. s1); the sequence identifier of the third and fourth outbound messages (i.e. s10); the inbound sequence number of the most recent inbound message that was sent (i.e. m2); producer data associated with the producer that generated the second inbound message (e.g. an identifier associated with the producer (505)—in the second example, the identifier is "P1"); the outbound sequence number of the most recent outbound message that was sent (i.e. m4) and consumer data associated with the consumer that is processing the outbound messages (e.g. an identifier associated with Consumer 1 (530)—in the second example, the identifier is "C1"). A representation of the log is shown in Table 7 in FIG. 9.

In response to logging (step 660) data, Intermediary 1 (510) determines (step 625) whether there are any further messages to be sent for processing having a matching sequence identifier to the first inbound message (i.e. s1m1). In the second example, Intermediary 1 (510) determines that there are no further messages to be sent for processing and the parallel intermediary thread continues to wait (step 665) for acknowledgements from Consumer 1 (530) that s10m1, s10m2, s10m3 and s10m4 have been processed.

In the second example, Consumer 1 (530) processes s10m1, s10m2, s10m3 and s10m4 (wherein the order for processing is specified by the order in which the messages arrive on the queue (535)). After s10m4 has been processed, Consumer 1 (510) generates and sends an acknowledgement to the parallel intermediary thread, acknowledging that s10m4 has been processed. Since in the second example, an acknowledgement for a message having a particular sequence number serves to also acknowledge every message having a lower sequence number, the acknowledgement also acknowledges that s10m1, s10m2 and s10m3 have been processed. It should be understood that alternatively, the messaging application can generate and transmit acknowledgments on behalf of a consumer instance.

The parallel intermediary thread makes a determination (step 670) as to whether any acknowledgments have been received. If no acknowledgments are received, a generator generates (step 695) an alert.

In the second example, parallel intermediary thread makes a determination (step 670) that an acknowledgement has been received (e.g. wherein the parallel intermediary thread can wait for acknowledgements for a pre-determined time).

In response to receiving the acknowledgment, the parallel intermediary thread checks (step 675) its log in order to determine (step 680) whether an acknowledgement acknowledging that one or more inbound messages have been processed can be sent to the producer (505).

That is, the parallel intermediary thread compares the sequence identifier and associated sequence number in the acknowledgement with the sequence identifier data and associated sequence number data in the log records. In response to the comparison, if the parallel intermediary thread determines that an acknowledgement has not been received for each outstanding outbound message associated with a particular sequence identifier that was sent, a generator generates (step 695) an alert.

In the second example, the parallel intermediary thread compares the acknowledgement for s10m4 against the log (as represented in Table 7). The sequence identifier of the acknowledgement matches the outbound sequence identifier data in the log record. The sequence number of the acknowledgement matches the most recent outbound sequence identifier data in the log record and thus, since the acknowledgement also acknowledges processing of every message with a sequence number less than 4 in m4, the acknowledgement also acknowledges processing of s10m1, s10m2 and s10m3.

Thus, in response to the comparison, the parallel intermediary thread determines that an acknowledgement has been received for each outstanding outbound message associated with a particular sequence identifier that was sent. Thus, the parallel intermediary thread generates (step 685) an acknowledgment for the associated first and second inbound messages generated by the producer (505) i.e. s1m1 and s1m2. Specifically, the parallel intermediary thread (step 685) an acknowledgment for s1m2 (which serves to acknowledge processing of every message with a sequence number less than 2 in m2 and thus, the acknowledgement also acknowledges processing of s1m1).

The parallel intermediary thread sends (step 685) the acknowledgment to the producer (505). It should be understood that alternatively, the messaging application can generate and transmit acknowledgments on behalf of an intermediary instance.

Since an acknowledgement associated with each outstanding outbound message associated with a particular sequence identifier that was sent has been received, the parallel intermediary thread purges (step 690) the log record associated with the sequence identifier of the outbound messages that have been processed (i.e. the log record in Table 7 associated with s10m4 (and hence associated with s10m1, s10m2 and s10m3)). Thus, the intermediary can "forget" that it has already selected a consumer for any given sequence. The intermediary can then select a new consumer instance next time it sees a message in that sequence.

With reference to FIG. 4, the parallel producer thread makes a determination (step 460) as to whether any acknowledgments have been received. If no acknowledgments are received, a generator generates (step 470) an alert.

In the second example, the parallel producer thread makes a determination (step 460) that an acknowledgment has been received. In response to receiving the acknowledgment, the parallel producer thread checks (step 465) the log in order to determine (step 475) whether the producer (305) can "forget" log records associated with the outstanding messages associated with the sequence identifier as described above.

In the second example, the acknowledgement for s1m2 (and hence s1m1) is compared against the log (as represented in Table 6). The sequence identifier of the acknowledgement matches the sequence identifier data in the log record. The sequence number of the acknowledgment matches the most recent sequence number data of the log record and thus, since the acknowledgment also acknowledges processing of every message with a sequence number of less than 2 in m2, the acknowledgment also acknowledges processing of m1 (i.e. a sequence number of 1, which is less than 2).

Thus the parallel producer thread purges (step 480) the log record associated with the sequence identifier of the messages that have been processed (i.e. the log record in Table 6 associated with s1m2 (and hence s1m1)).

Thus, a producer is configurable to send all messages outstanding in the system having the same sequence identifier to the same instance of an intermediary. This allows order to be preserved within the sequence, since a single intermediary processes the messages in the order in which the messages arrive on its associated queue. Furthermore, only when acknowledgements for each outstanding message (i.e. m1, m2) having the same sequence identifier (i.e. s1) that has been sent to the same instance of an intermediary (i.e. I1) have been received, can a producer "forget" that it has already chosen an intermediary for any given sequence. The producer (505) can then select a new intermediary instance next time it sees a message in that sequence.

This also applies to intermediaries, wherein an intermediary is configurable to all outbound messages outstanding in the system having the same sequence identifier to the same instance of a consumer. Furthermore, only when acknowledgements for each outstanding outbound message (i.e. m1, m2, m3 and m4) having the same sequence identifier (i.e. s10) that has been sent to the same instance of an consumer (i.e. C1) have been received, can an intermediary "forget" that it has already chosen a consumer for any given sequence. The intermediary can then select a new consumer instance next time it sees a message in that sequence.

It should be understood, that the optimization of the generation and receipt of acknowledgements described above in relation to consumers, also applies to intermediaries.

It should be understood the present invention can also be utilized in a system wherein multiple consumer or intermediary instances reside on a single physical computer system. Such a system is advantageous in that communications are quicker, since the processing occurs in memory. In this example, a dispatcher can select a consumer or intermediary instance in memory to which to send messages associated with a sequence identifier to, can log message data and consumer data or intermediary data and can receive acknowledgements from a consumer instance or an intermediary instance. It should be understood that the dispatcher can reside on the same physical computer system as the consumer or intermediary instances or can reside on a different physical computer system.

It should be understood that the present invention is scalable to multiple (clusters) of intermediaries. For example, a first cluster of intermediaries can transform a message and send the message to a second cluster of intermediaries. The second cluster of intermediaries can log data associated with the message and forward the message to a consumer.

What is claimed is:

1. A system for preserving order associated with messages, the system comprising:
    an intermediary operable to receive a first message associated with a first sequence identifier;
    a selecting component operable to select a first entity for processing the first message;
    a determination component for determining whether an acknowledgment associated with completion of processing of the first message has been received by the intermediary; and
    a controller for controlling the selecting component to select a second entity for processing a second message associated with the first sequence identifier, in response to a combination of:
    receipt of the acknowledgment, and
    receipt of the second message associated with the first sequence identifier being received by the intermediary before the receipt of the acknowledgment.

2. The system as claimed in claim 1, further comprising a logging component for logging data associated with the first message and for logging data associated with the first entity, wherein the data is logged in a storage component.

3. The system as claimed in claim 2, wherein the storage component is persistent.

4. The system as claimed in claim 3, wherein data in the storage component is purged in response to receipt of the acknowledgment.

5. The system as claimed in claim 4, wherein the first entity is operable to forward the first message to a third entity for processing and the logging component is further operable to log data associated with the first message and to log data associated with the third entity.

6. The system as claimed in claim 3, wherein the first entity is operable to forward the first message to a third entity for processing and the logging component is further operable to log data associated with the first message and to log data associated with the third entity.

7. The system as claimed in claim 6, wherein the first entity is operable to generate the acknowledgment in response to receipt of another acknowledgment associated with completion of processing of the first message from the third entity.

8. The system as claimed in claim 2, wherein the first entity is operable to forward the first message to a third entity for processing and the logging component is further operable to log data associated with the first message and to log data associated with the third entity.

9. The system as claimed in claim 8, wherein the first entity is operable to forward the first message to a third entity for processing and the logging component is further operable to log data associated with the first message and to log data associated with the third entity.

10. The system as claimed in claim 1, wherein the first entity is operable to forward the first message to a third entity for processing and a logging component is operable to log data associated with the first message and data associated with the third entity.

11. The system as claimed in claim 10, wherein the first entity is operable to generate the notification acknowledgment in response to receipt of another acknowledgment associated with completion of processing of the first message from the third entity.

12. A method for preserving an order associated with messages, the method comprising:
    receiving by an intermediary, a first message associated with a first sequence identifier;
    selecting by a selecting component, a first entity for processing the first message;
    determining whether an acknowledgment associated with completion of processing of the first message has been received by the intermediary; and
    controlling the selecting component to select a second entity for processing a second message, in response to a combination of:
    receipt of the acknowledgment, and
    receipt of the second message associated with the first sequence identifier being received by the intermediary before the receipt of the acknowledgment.

13. The method as claimed in claim 12, further comprising logging data associated with the first message and logging data associated with the first entity, wherein the data is logged in a storage component.

14. The method as claimed in claim 13, further comprising persisting the storage component.

15. The method as claimed in claim 14, further comprising purging data in the storage component in response to receipt of the acknowledgment.

16. The method as claimed in claim 15, further comprising forwarding the first message by the first entity to a third entity for processing and logging data associated with the first message and data associated with the third entity.

17. The method as claimed in claim 16, further comprising generating the acknowledgment by the first entity in response to receipt of another acknowledgment associated with completion of processing of the first message from the third entity.

18. A computer-readable storage memory embodying computer program instructions for preserving order associated with messages which, when executed by a processor, causes the processor to perform:
receiving by an intermediary, a first message associated with a first sequence identifier;
selecting by a selecting component, a first entity for processing the first message;
determining whether an acknowledgment associated with completion of processing of the first message has been received by the intermediary; and
controlling the selecting component to select a second entity for processing a second message, in response to a combination of:
receipt of the acknowledgment, and
receipt of the second message associated with the first sequence identifier being received by the intermediary before the receipt of the acknowledgment.

19. The computer-readable storage medium as claimed in claim 18 including further computer program instructions for causing the computer to perform logging data associated with the first message and logging data associated with the first entity, wherein the data is logged in a storage component.

20. The computer-readable storage medium as claimed in claim 19 including further computer program instructions for causing the computer to perform purging data in the storage component in response to receipt of the acknowledgment.

* * * * *